United States Patent [19]

Sato et al.

[11] 4,454,165

[45] Jun. 12, 1984

[54] PREPARATION OF ALCOHOL-CONTAINING POWDERS

[75] Inventors: Jinichi Sato; Toshiro Kurusu; Masao Ota, all of Aichi; Terumasa Mizutani, Gifu, all of Japan

[73] Assignee: Sato Shokuhin Kogyo Kabushiki Kaisha, Komaki, Japan

[21] Appl. No.: 360,320

[22] Filed: Mar. 22, 1982

[30] Foreign Application Priority Data

Nov. 27, 1981 [JP] Japan .................................. 56-189167

[51] Int. Cl.³ .................... C12G 3/04; C12G 3/06; C12P 19/14
[52] U.S. Cl. .................................... 426/592; 426/456; 426/471; 435/99
[58] Field of Search ....................... 426/592, 471, 456; 435/99, 162

[56] References Cited

U.S. PATENT DOCUMENTS

| | | | |
|---|---|---|---|
| 3,786,159 | 1/1974 | Sato et al. | 426/592 X |
| 3,956,509 | 5/1976 | Mitchell et al. | 426/592 X |
| 4,039,383 | 8/1977 | Pankratz | 435/99 |
| 4,052,226 | 10/1977 | Verbanac | 435/99 X |
| 4,298,400 | 11/1981 | Armbruster | 435/99 X |
| 4,356,266 | 10/1982 | Muller et al. | 435/99 X |

OTHER PUBLICATIONS

The Condensed Chemical Dictionary, 8th ed., VNR Co., N.Y., 1971 (p. 644).

*Primary Examiner*—David M. Naff
*Attorney, Agent, or Firm*—Browdy and Neimark

[57] ABSTRACT

Alcohol-containing powders having a high alcohol content with a high alcohol yield are prepared by mixing a hydrolyzed starch comprising at least 50% of oligosaccharides having a glucose polymerization degree of up to 8 and up to 10% of saccharides having a glucose polymerization degree of up to 2 in an alcohol-containing aqueous solution and spray-drying the resulting liquid mixture.

3 Claims, No Drawings

PREPARATION OF ALCOHOL-CONTAINING POWDERS

The present invention relates to a process for preparing alcohol-containing powders having a high alcohol content with a high alcohol yield rate.

More particularly, the present invention relates to a process for preparing an alcohol-containing powder having a good water solubility, a good taste and a good storage stability.

As the conventional process for powdering of an aqueous alcohol solution such as liquor (alcoholic beverage), there is known a process comprising mixing an aqueous solution of an alcohol having an appropriate concentration with a relatively large amount of a water-soluble covering substance such as corn syrup solid, soluble starch, modified starch, gelatin, gum arabic and CMC and spray-drying the mixture. The alcohol-containing powder obtained according to this process is formed into an alcoholic drink merely by dissolving it into water or warm water just before drinking. Furthermore, this alcohol-containing powder is broadly used as a material for production of various processed foods and cakes. In Japan, such alcohol-containing powder is ranked as "powdered liquor" (Funmatushu according to the Liquor Tax Act) and is treated as a kind of liquor.

In preparing such alcohol-containing powder, it is required to obtain a product excellent in solubility in water, viscousness (sticky feel), taste (the taste, smell and the like of the covering substance), moisture absorption resistance and caking resistance in the powdery state. Simultaneously, it is required that the alcohol content in the powder should be high and the alcohol yield rate (the alcohol remaining ratio) should also be high to render the preparation process economically and industrially advantageous.

However, in the conventional process, in order to prepare an alcohol-containing powder having a high alcohol content and being excellent in the above-mentioned properties at a high alcohol yield rate, various difficulties should be overcome. Furthermore, the conventional process is defective in that in powdering an aqueous solution of an alcohol containing a perfume component, such as liquor, not only the alcohol yield rate but also the perfume component remaining ratio is low.

We therefore tried to prepare alcohol-containing powders having a high alcohol content at a high alcohol yield rate by using hydrolyzed starches having a controlled DE value to overcome the foregoing defects, but deviations of the alcohol yield rate were observed among lots and no satisfactory results were obtained. For example, when various hydrolyzed starches having a DE value of 18, which was considered preferable from experience, were prepared and alcohol-containing powders were prepared from these hydrolyzed starches, even though the DE value was the same in the hydrolyzed starches, deviations of not only the alcohol yield rate but also the properties of the products such as solubility and taste were observed.

With a view to eliminating the difficulties involved in the preparation of alcohol-containing powders, we furthered our research apart from the DE value, and we found that the quality of an alcohol-containing powder is influenced by the glucose polymerization degree and that when a hydrolyzed starch comprising at least 50% of oligosaccharides having a glucose polymerization degree of up to 8 and up to 10% of saccharides having a glucose polymerization degree of up to 2 is used, an alcohol-containing powder excellent in quality can be obtained at a high alcohol yield rate.

The present invention has now been completed based on this finding. More specifically, in accordance with the present invention, there is provided a process for the preparation of alcohol-containing powders, which comprises mixing a hydrolyzed starch comprising at least 50% of oligosaccharides having a glucose polymerization degree of up to 8 and up to 10% of saccharides having a glucose polymerization degree of up to 2 in an alcohol-containing aqueous solution and spray-drying the resulting liquid mixture.

The present invention is characterized in that in spray-drying a mixture of an aqueous solution of an alcohol with a hydrolyzed starch, there is selected and used a hydrolyzed starch comprising up to 10%, preferably up to 5%, of saccharides having a glucose polymerization degree of up to 2, and up to 50% of a polysaccharide having a glucose polymerization degree of at least 9, that is, a hydrolyzed starch comprising at least 40% of oligosaccharides having a glucose polymerization degree of 3 to 8, and this selected hydrolyzed starch is incorporated in and mixed in an aqueous solution of an alcohol having an alcohol concentration of at least 40% (by weight) in an amount of at least 120% based on water contained in the aqueous alcohol solution. In the instant specification, all of the alcohol concentrations are expressed in terms of "%" which means weight percentage. Further, symbol "G" indicates glucose and the suffix number indicates the polymerization degree. For example, $G_1$, $G_2$ and $G_3$ represent glucose, maltose and maltotriose, respectively, and $G_{9-n}$ represents saccharides having a glucose polymerization degree of at least 9. Furthermore, "saccharides having a glucose polymerization degree of up to 2" and "oligosaccharides having a glucose polymerization degree of up to 8" include $G_1$ (glucose).

Ordinarily, oligosaccharides are hardly present naturally in the free form, and they are obtained in the form hydrolyzed by an acid or enzyme, such as amylose, amylopectin or glycogen. An oligosaccharide formed by partial hydrolysis of a starch with an acid or enzyme has an α-1,4-linkage and a small amount of α-1,6-linkage is sometimes present. Results of determination of the saccharide composition properties of commercially available hydrolyzed starches are shown in Table 1.

TABLE 1

| | D.E. | $G_1$ | $G_2$ | $G_3$ | $G_4$ | $G_5$ | $G_6$ | $G_7$ | $G_8$ | $G_{9-n}$ | Viscosity (cps) | Alcohol-Soluble Critical Concentration (%) |
|---|---|---|---|---|---|---|---|---|---|---|---|---|
| Product A (hydrolyzed by enzyme) | 8.5 | trace | 1.2 | 2.7 | 2.7 | 2.3 | 4.4 | 5.7 | 5.3 | 75.7 | 145 | 36.5 |
| Product B (hydrolyzed by enzyme) | 11 | 0.6 | 3.1 | 4.8 | 4.2 | 4.2 | 6.3 | 7.0 | 6.9 | 62.9 | 68 | 38.0 |

TABLE 1-continued

| | D.E. | $G_1$ | $G_2$ | $G_3$ | $G_4$ | $G_5$ | $G_6$ | $G_7$ | $G_8$ | $G_{9-n}$ | Viscosity (cps) | Alcohol-Soluble Critical Concentration (%) |
|---|---|---|---|---|---|---|---|---|---|---|---|---|
| Product C (hydrolyzed by acid) | 15 | 3.9 | 4.4 | 4.3 | 4.2 | 3.9 | 3.2 | 3.0 | 3.3 | 69.8 | 72 | 37.3 |
| Product D (hydrolyzed by enzyme) | 16 | 2.6 | 4.5 | 5.2 | 4.6 | 4.4 | 6.8 | 6.7 | 5.2 | 60.0 | 45 | 43 |
| Product E (acid-enzyme hydrolyzed) | 18 | 4.5 | 6.8 | 4.9 | 4.8 | 5.1 | 4.7 | 4.9 | 5.9 | 58.4 | 40 | 49.8 |
| Product F (acid-enzyme hydrolyzed) | 23 | 7.1 | 7.4 | 7.8 | 8.2 | 8.0 | 7.2 | 6.8 | 8.9 | 38.6 | 23 | 57.7 |
| Product G (acid-enzyme hydrolyzed) | 27 | 8.5 | 8.4 | 8.5 | 9.8 | 11.2 | 10.5 | 8.1 | 9.5 | 25.5 | 15 | 61.2 |

The DE value is ordinarily adopted as the value indicating the degree of hydrolysis in a hydrolyzed starch and is often used as the factor for judging the average molecular weight, sweetness, viscosity and moisture-absorbing property. However, since the DE value is calculated based on results of the measurement made on a direct reducing sugar of a hydrolyzed starch, the characteristics of the saccharide composition or properties of the hydrolyzed starch cannot strictly be expressed by the DE value. For example, since the acid hydrolysis is considerably different from the enzyme hydrolysis in the hydrolyzing mechanism, even if the DE value is the same, the saccharide composition of the hydrolyzed starch obtained by the acid hydrolysis is different from that of the hydrolyzed starch obtained by the enzyme hydrolysis and properties are different between the two hydrolyzed starches.

As is apparent from Table 1, it is substantially impossible to guess the saccharide composition of hydrolyzed starch from the DE value. It is seen that a hydrolyzed starch used in the present invention, which comprises at least 40% of oligosaccharides having a glucose polymerization degree of 3 to 8 and up to 10% of saccharides having a glucose polymerization degree of up to 2, is not found in commercially available products.

The hydrolyzed starch that is used in the present invention, which comprises up to 10% of low saccharides having a glucose polymerization degree of up to 2 and up to 50% of polysaccharides having a glucose polymerization degree of at least 9, that is, at least 40% of oligosaccharides having a glucose polymerization degree of 3 to 8, is prepared according to methods described below. Of course, hydrolyzed starches obtained according to other methods may be used so far as the intended objects of the present invention can be attained by using these hydrolyzed starches.

[1] A method comprising fractionating a hydrolyzed starch obtained by conventional acid or enzyme hydrolysis (hydrolyzed starch containing oligosaccharides $G_3$ to $G_8$ at contents as high as possible, that is, hydrolyzed starch obtained mainly by enzyme hydrolysis and having a DE value of 15 to 30, are preferred) with an alcohol and separating and removing unnecessary components to obtain a hydrolyzed starch having the above-mentioned saccharide composition.

[2] A method comprising subjecting a starch to special two-staged liquefaction using α-amylase to obtain a hydrolyzed starch having the above-mentioned saccharide composition.

According to the conventional technique, it was very difficult to obtain only a product having a special polymerization degree by a reaction using an acid and α-amylase, but recently (1972-1973), there was developed a method for obtaining a hydrolyzed starch composed mainly of oligosaccharides and having reduced contents of glucose and maltose by special two-staged liquefaction utilizing α-amylase having a substrate-peculiarity capable of selectively hydrolyzing relatively high molecules.

[3] A method comprising biochemically converting (digesting and removing) low saccharides $G_1$ and $G_2$ contained in a hydrolyzed starch (hydrolyzed starch containing oligosaccharides $G_3$ to $G_8$ at contents as high as possible and having reduced contents of saccharides $G_9$ to $G_n$ being preferred) with a microorganism such as yeast.

[4] A method in which a liquefied starch is reacted with a malt-oligosaccharide-forming enzyme such as malt-pentaose-forming enzyme and the resulting hydrolyzed starch having a high malt-oligosaccharide content is treated according to the above method [1] or [3] or it is directly used when the saccharide composition is within the above-mentioned range.

As the starting starch used in the above-mentioned method, there can be mentioned ordinary starches such as corn starch, potato starch and tapioca starch and starch type substrates such as amylose, amylopectin and glycogen.

In the process for the preparation of alcohol-containing powders according to the present invention, in addition to the above-mentioned specific hydrolyzed starch, there may be used a covering substance (carrier) such as gelatin, gum arabic or CMC, so far as the characteristic features of the process of the present invention are not lost.

The hydrolyzed starch that is used in the present invention should satisfy the basic requirement that the content of oligosaccharides having a glucose polymerization degree of up to 8 should be at least 50% and the content of saccharides having a glucose polymerization degree of up to 2 should be up to 10%. However, a hydrolyzed starch in which the content of saccharides having a glucose polymerization degree of up to 2 is up to 5%, that is, such low saccharides are hardly contained, is especially preferred. If such hydrolyzed starch is used, the alcohol yield rate can further be improved.

It is preferred that the hydrolyzed starch used in the present invention be soluble in a 40 W/W % aqueous solution of an alcohol (this means that when a 25% aqueous solution of the hydrolyzed starch is added to a 40 W/W % aqueous solution of an alcohol (25° C.) in an amount of 5% based on the solution, the absorbancy of the mixture at 600 nm after 5 minutes is less than 0.5). The alcohol soluble critical concentration of the hydrolyzed starch is determined according to the polymerization degree and amount of a high polymer portion of the hydrolyzed starch. As is seen from the results obtained in the Test described hereinafter, if the hydrolyzed starch is soluble in an aqueous alcohol solution having a concentration of at least 40 W/W %, the hydrolyzed starch may be added to and mixed in an aqueous alcohol solution having a high alcohol concentration and it is possible to prepare an alcohol-containing powder having a high alcohol content at a high alcohol yield rate.

In the present invention, a hydrolyzed starch comand lower two transparent layers. The upper layer was separated and dried to obtain a fraction A.

To the separated lower layer was added 130 Kg of an aqueous alcohol solution having an alcohol concentration of 47% to obtain an opaque liquid mixture. The liquid mixture was allowed to stand still for 12 hours to obtain upper and lower two transparent layer. The upper layer was separated and dried to obtain a fraction B. The lower layer was dried to obtain a fraction C. The analitical result of the so-obtained fractions A, B and C are shown in Table 2.

TABLE 2

| | $G_1$ (%) | $G_2$ (%) | $G_3$ (%) | $G_4$ (%) | $G_5$ (%) | $G_6$ (%) | $G_7$ (%) | $G_8$ (%) | $G_{9-n}$ (%) | DE | Viscosity (cps) | Alcohol-Soluble Critical Concentration (%) |
|---|---|---|---|---|---|---|---|---|---|---|---|---|
| Hydrolyzed Starch (before fractionation) | 7.3 | 6.8 | 6.4 | 5.7 | 5.6 | 5.3 | 5.5 | 6.6 | 50.8 | 21.5 | 38 | 52 |
| Fraction A | 20.3 | 17.5 | 9.4 | 8.1 | 6.6 | 4.7 | 3.8 | 3.2 | 26.4 | 40 | 12 | 65 |
| Fraction B | 1.8 | 2.1 | 7.8 | 8.0 | 7.7 | 8.2 | 9.4 | 11.5 | 43.5 | 16 | 27 | 45 |
| Fraction C | 1.4 | 1.6 | 2.4 | 2.3 | 2.5 | 2.1 | 2.8 | 3.5 | 81.3 | 10 | 105 | 38 | prising at least 50% of oligosaccharides having a glucose polymerization degree of up to 8 and up to 10% of saccharides having a glucose polymerization degree of up to 2 is added to and mixed in an alcohol-containing aqueous solution and the resulting liquid mixture is spray-dried.

As the alcohol-containing aqueous solution, there can be mentioned aqueous alcohols, brewages (fermented liquors) such as refined "sake" and wine, spirits such as whisky, brandy, rum and "shochu", mixed liquors such as "mirin", liqueur and herb spirits, seasoning liquors such as wine and "mirin" rendered undrinkable, perfumes such as vanilla tincture and orange essence, spice tinctures such as pepper tincture and ginger ale tincture, raw drug tinctures such as licorice root tincture and green gentian tincture, aqueous alcohol extracts of table luxury materials such as tea leaves, coffee beans and cocoa beans, aqueous alcohol extracts of seasoning materials such as dried bonito and tangle, and alcohol mixtures thereof.

The hydrolyzed starch is added to an alcohol-containing aqueous solution having an alcohol concentration of at least 20 W/W %, preferably at least 40 W/W %, in an amount of 100 to 200% based on water contained in the alcohol-containing aqueous solution, and the resulting liquid mixture is spray-dried.

According to the above-mentioned process of the present invention, various alcohol-containing powders having a high alcohol content can be obtained at high alcohol yield rate.

The test of the present invention will now be described.

TEST

α-Amylase was added to an emulsion of corn starch and the hydrolysis was conducted until the DE value was 8. The hydrolysis liquid was heated at 130° C. for 10 minutes and cooled, and α-amylase was added again and the hydrolysis was conducted until the DE value was 21.5. The analitical result of the obtained hydrolyzed starch (before fractionation) are shown in Table 2.

To 200 Kg of an aqueous alcohol solution having an alcohol concentration of 58% was added 100 Kg of a dried product of the obtained hydrolyzed starch to obtain an opaque liquid mixture. This liquid mixture was allowed to stand still for 12 hours to obtain upper By using the fractions A, B and C, a 1:3 mixture of the fractions A and C, and the hydrolyzed starch before fractionation, liquid mixtures (40° C.) differing in the amount of the alcohol to water and the amounts of saccharides to water, as shown in Tables 3, 4, 5, 6 and 7, were prepared. Each liquid mixture was heated at 60° C. by a plate heater and was then spray-dried at a chamber temperature of 75° C. Thus, alcohol-containing powders shown in Tables 3 through 7 were obtained. Furthermore, liquid mixtures shown in Table 8 were prepared by using commercially available glucose, commercially available maltose (comprising 95% of maltose and 5% of glucose) and maltotriose (comprising 90% of maltotriose and 5% of maltohexaose) prepared by hydrolyzing of pullulan (pullulan PF-10 supplied by Hayashibara K.K.), by pullulanase (CK20-L supplied by Amano Seiyaku K.K.), and each liquid mixture was spray-dried at a chamber temperature of 75° C. The obtained results are shown in Table 8.

TABLE 3

| Case of Hydrolyzed Starch of Fraction A | | | | | |
|---|---|---|---|---|---|
| Amount (parts) of Alcohol per 100 parts of Water | Amount (parts) of Hydrolyzed Starch per 100 Parts of Water | | | | |
| | 90 | 110 | 130 | 150 | 170 |
| 90 | 15.5% (21.5) | 17.9% (28.0) | 19.6% (37.1) | 19.3% (41.9) | 18.5% (45.1) |
| 80 | 14.6% (20.2) | 14.8% (25.1) | 17.4% (36.0) | 17.4% (41.5) | 16.8% (45.1) |
| 70 | 10.6% (15.9) | 11.7% (21.8) | 14.5% (33.0) | 14.7% (38.7) | 14.3% (42.5) |
| 60 | 6.7% (11.3) | 8.2% (17.1) | 11.3% (28.9) | 11.8% (35.0) | 11.4% (38.2) |

TABLE 4

| Case of Hydrolyzed Starch of Fraction B | | | | | |
|---|---|---|---|---|---|
| Amount (parts) of Alcohol per 100 Parts of Water | Amount (parts) of Hydrolyzed Starch per 100 Parts of Water | | | | |
| | 90 | 110 | 130 | 150 | 170 |
| 90 | 34.2% (55.3%) | 36.5% (75.0%) | 35.9% (86.3%) | 33.7% (90.2%) | 31.9% (94.0%) |
| 80 | 31.9% (56.0%) | 33.7% (74.4%) | 33.2% (86.1%) | 31.2% (90.3%) | 29.3% (93.3%) |
| 70 | 25.8% (47.3%) | 30.6% (73.5%) | 29.7% (83.2%) | 27.7% (86.9%) | 26.5 (92.6%) |

TABLE 4-continued

Case of Hydrolyzed Starch of Fraction B

| Amount (parts) of Alcohol per 100 Parts of Water | Amount (parts) of Hydrolyzed Starch per 100 Parts of Water | | | | |
|---|---|---|---|---|---|
| | 90 | 110 | 130 | 150 | 170 |
| 60 | 22.1% (44.9%) | 26.8% (71.0%) | 26.2% (81.3%) | 24.6% (86.1%) | 23.7% (92.9%) |

TABLE 5

Case of Hydrolyzed Starch of Fraction C

| Amount (parts) of Alcohol per 100 Parts of Water | Amount (parts) of Hydrolyzed Starch per 100 Parts of Water | | | | |
|---|---|---|---|---|---|
| | 90 | 110 | 130 | 150 | 170 |
| 90 | white turbidity A 18.0% (23.1%) | white turbidity A 18.8% (29.8%) | white turbidity A 15.5% (27.8%) | white turbidity A 10.8% (21.1%) | spray drying impossible because of too high viscosity |
| 80 | white turbidity B 20.3% (37.9%) | white turbidity B 20.5% (37.3%) | white turbidity B 16.9% (34.7%) | white turbidity B 14.5% (33.4%) | spray drying impossible because of too high viscosity |
| 70 | white turbidity C 25.5% (46.5%) | white turbidity C 26.0% (58.4%) | white turbidity C 24.0% (61.9%) | spray drying impossible because of too high viscosity | spray drying impossible because of too high viscosity |
| 60 | 27.3% (59.6%) | 27.8% (74.7%) | 26.6% (83.0%) | spray drying impossible because of too high viscosity | spray drying impossible because of too high viscosity |

TABLE 6

Case of Hydrolyzed Starch of 1:3 Mixture of Fractions A and C

| Amount (parts) of Alcohol per 100 Parts of Water | Amount (parts) of Hydrolyzed Starch per 100 Parts of Water | | | | |
|---|---|---|---|---|---|
| | 90 | 110 | 130 | 150 | 170 |
| 90 | white turbidity B 20.3% (26.8%) | white turbidity B 19.8% (31.7%) | white turbidity A 16.3% (29.5%) | white turbidity A 12.5% (25.0%) | white turbidity A 9.6% (21.0%) |
| 80 | white turbidity C 21.4% (32.3%) | white turbidity B 24.2% (47.7%) | white turbidity B 20.5% (44.1%) | white turbidity B 18.0% (43.3%) | white turbidity B 13.2% (33.9%) |
| 70 | 25.6% (46.8%) | 27.5% (63.1%) | 25.9% (68.6%) | white turbidity C 23.0% (67.5%) | spray drying impossible because of too high viscosity |
| 60 | 22.4% (45.7%) | 23.6% (59.8%) | 22.7% (67.1%) | 21.4% (71.7%) | spray drying impossible because of too high viscosity |

TABLE 7

Case of Hydrolyzed Starch before Fractionation

| Amount (parts) of Alcohol per 100 Parts of Water | Amount (parts) of Hydrolyzed Starch per 100 Parts of Water | | | | |
|---|---|---|---|---|---|
| | 90 | 110 | 130 | 150 | 170 |
| 90 | 21.4% (28.7%) | 28.6% (51.9%) | 29.5% (64.1%) | 28.7% (71.1%) | 27.8% (77.0%) |
| 80 | 19.3% (28.3%) | 26.0% (51.1%) | 27.2% (64.2%) | 26.3% (70.8%) | 25.6% (77.3%) |
| 70 | 17.2% (28.1%) | 22.4% (47.8%) | 23.8% (61.2%) | 23.1% (67.9%) | 23.0% (76.5%) |
| 60 | 15.1% (28.0%) | 18.9% (44.9%) | 19.8% (56.3%) | 20.0% (65.8%) | 20.3% (75.9%) |

TABLE 8

Case of Glucose, Maltose and Maltotriose
(Alcohol:Water:Saccharide Mixing Ratio = 46:54:100)

| Saccharide | Alcohol Content | Alcohol Yield Rate | Drying State |
|---|---|---|---|
| Glucose | — | — | All adhered to chamber wall and recovery of powder was impossible |
| Maltose | 6.0% | 15% | Adherence to chamber wall was observed and powder recovery ratio was about 70% |

TABLE 8-continued

Case of Glucose, Maltose and Maltotriose
(Alcohol:Water:Saccharide Mixing Ratio = 46:54:100)

| Saccharide | Alcohol Content | Alcohol Yield Rate | Drying State |
|---|---|---|---|
| Maltotriose | 28.8% | 72% | Adherence to chamber wall was observed and obtained powder had relatively high moisture-absorbing property |

In Tables 3 through 8, each of % values is the alcohol content of alcohol containing powder and each of parenthesized % values is the alcohol yield rate.

In Tables 5 and 6, "white turbidity" indicates that the covering substance (carrier) is not dissolved in an aqueous alcohol and separation is caused in the liquid mixture. More specifically, "white turbidity A" indicates that prominent white turbidity is observed and separation of the liquid mixture to upper and lower two layers takes place immediately, "white turbidity C" indicates that white turbidity is observed but separation is hardly caused, and "white turbidity B" indicates the intermediate state between white turbidity A and white turbidity C. These liquid mixtures were spray-dried with sufficient stirring.

In Tables 5 and 6, the case where spray drying was impossible because of too high a viscosity of the liquid mixture is indicated by "spray drying impossible because of too high viscosity".

In the present invention, the saccharide composition, viscosity, alcohol soluble critical concentration and alcohol yield rate are determined and calculated according to the following methods.

Saccharide Composition:

The saccharide composition was qualitatively determined by a liquid chromatography using PNH$_2$-10/S2504 (supplied by Shimazu Seisakusho) as the column, an acetonitrile-water as the moving phase and a differential diffractometer as the detecting device.

Viscosity:

The sample (500 g) was dissolved in 500 g of water, and the viscosity was measured by a cylinder type rotary viscometer at 40° C.

Alcohol Soluble Critical Concentration:

Aqueous alcohol solutions (25° C.) differing in the alcohol concentration were prepared. Test tubes were charged with 10 ml each of the aqueous alcohol solutions, respectively, and 0.5 ml of a 25% aqueous solution of the sample was added to each test tube. After passage of 5 minutes, the absorbancy at 600 nm was measured. The obtained results were plotted on a graph, and the concentration of the aqueous alcohol solution giving the absorbancy of 0.5 was read and defined as the soluble critical concentration.

Alcohol Utilization Ratio:

The alcohol yield rate was calculated according to the following formula:

Alcohol yield rate (%) = $B/C \times E \times 100/A$ wherein A stands for the amount used of the alcohol, B stands for the amount used of the saccharide (solid), C stands for the amount (%) of the saccharide (solid) contained in the produced alcohol-containing powder, D stands for the amount (%) of water contained in the produced alcohol-containing powder, and E stands for the alcohol content (%) in the produced alcohol-containing powder.

Incidentally, $G_1$, $G_2$, $G_3$, ... $G_n$ stand for saccharides having glucose polymerization degrees of 1, 2, 3, ... n, respectively.

As is seen from Table 3, when the fraction A having the $G_1$ and $G_2$ content exceeding 30% is used, although it can be added in large amounts to aqueous alcohol solutions having a high alcohol concentration, and in large amounts based on water contained aqueous alcohol solution, the alcohol yield rate is very low. As is seen from Table 5, when the fraction C having the $G_{9-n}$ polysaccharide content exceeding 80% is used, the alcohol soluble critical concentration is low and the fraction C is insoluble in an aqueous alcohol solution having a high alcohol concentration, and the viscosity is very high and the amount dissolved in water is small. Accordingly, even if it is intended to obtain a high alcohol content and a high alcohol yield rate, since a mixed liquid is prepared in occurrence of white turbidity and separation or can not be sprayed mechanically by too high viscosity, it is impossible to prepare the intended alcohol-containing powder. But, when the alcohol concentration is low and the amount added of the fraction C to water is small, the obtained alcohol yield rate and alcohol content are not inferior to those obtained by using the fraction B (shown in Table 4) if the amount added of the fraction B and the alcohol concentration are the same as described above, but a powder having a high alcohol content and a high alcohol yield rate cannot be obtained. From the experimental data of the 1:3 mixture of the fractions A and C, shown in Table 6, it is seen that although the average polymerization degree of the mixture is substantially the same as that of the fraction B, bad influences of low saccharides $G_1$ and $G_2$ and polysaccharides $G_{9-n}$ are conspicuous, and therefore, the alcohol yield rate is low and it is impossible to prepare a product having a high alcohol content. From the experimental data shown in Table 8, it is seen that maltotriose ($G_3$) has an alcohol-covering property and low saccharides ($G_1$ and $G_2$) have no substantial covering property, and that in case of such low saccharide, powdering is very difficult.

From the foregoing experimental data, it is seen that among saccharides component of hydrolyzed starches, those having a glucose polymerization degree of at least 3 have an alcohol-covering property, and that low saccharides $G_1$ and $G_2$ have no substantial covering property and powdering of these low saccharides is very difficult. From the data shown in Tables 3 through 7, it is seen that as the amount of the covering substance (carrier) to water (and the aqueous alcohol solution) is large (the concentration is high), the alcohol yield rate is increased. From the data shown in Tables 3 through 7, it also is seen that as the concentration of the carrier is increased, the alcohol content in the resulting powder is reduced. Accordingly, it is apparent that in order to prepare a powder having a high alcohol content at a high alcohol yield rate, it is necessary to add an carrier at a high concentration to an aqueous alcohol solution having a high alcohol concentration. However, polysaccharides having a glucose polymerization degree of at least about 9 have an alcohol-covering property sufficiently, but in proportion as the polymerization degree increases, it becomes difficult to dissolve in an aqueous alcohol solution having a high alcohol concentration and in water at high concentration (Because the viscosity is high). Consequently, it is found that polysaccharides having a glucose polymerization degree of at least about 9 is not suitable to produce alcohol-containing powder with a high alcohol content at a high alcohol yield rate.

Collectively judging from the foregoing experimental data, when a hydrolyzed starch soluble in an aqueous alcohol having an alcohol concentration of at least 40 W/W %, which comprises up to 50% of a polysaccharide having a glucose polymerization degree of at least 9, at least 50% of oligosaccharides having a glucose polymerization degree of up to 8 and up to 10% of low saccharides having a glucose polymerization degree of up to 2, is selected and when the selected hydrolyzed starch is added to an aqueous alcohol solution and the resulting liquid mixture is spray-dried at a temperature as low as possible, an alcohol-containing powder having a high alcohol content can be obtained at a high alcohol yield rate, and the water solubility of the obtained alcohol-containing powder is very good and an aqueous solution of the alcohol-containing powder has a low viscosity. Furthermore, the obtained alcohol-containing powder is low in the sweetness due to the covering substance and is excellent in various properties such as the moisture absorption resistance, anti-caking property and perfume-retaining property in the powdery state. In conclusion, it is found that in the case where the saccharide composition is within the above-mentioned range, as the content of oligosaccharides $G_3$ to $G_8$ is increased, the properties of the resulting alcohol-containing powder can be improved.

In the present invention, not only the alcohol component but also various perfume components can be simultaneously powdered. It has been found that the remaining ratio of perfume components having a low boiling point approximating to that of the alcohol is substantially proportional to the alcohol yield rate. Accordingly, in order to obtain an alcohol-containing powder of liquor or the like retaining perfume components, it is important to enhance the alcohol yield rate.

The present invention will now be described in detail with reference to the following Examples.

EXAMPLE 1

To 300 Kg of an aqueous alcohol solution having an alcohol concentration of 63% was added with stirring 150 Kg of a hydrolyzed starch (having a DE value of 24 and a water content of 5.0%) having a saccharide composition of 7.8% of $G_1$, 7.7% of $G_2$, 8.6% of $G_3$, 8.2% of $G_4$, 7.5% of $G_5$, 7.2% of $G_6$, 6.4% of $G_7$, 7.5% of $G_8$ and 39.1% of $G_{9-n}$, to obtain an opaque liquid mixture. This liquid mixture was allowed to stand still for 15 hours to separate it into upper and lower two transparent layers. By fractionation, there were obtained 205 Kg of an upper layer having a solid content of 13.8%, an alcohol content of 58.5% and a water content of 27.7% and 245 Kg of a lower layer having a solid content of 46.5%, an alcohol content of 28.2% and a water content of 25.3%.

To 245 Kg of the obtained lower layer was added 5 Kg of water, and the resulting liquid mixture was heated at 60° C. by a plate heater and spray-dried at a chamber temperature of 75° C. to obtain about 180 Kg of an alcohol-containing powder having an alcohol content of 35% and a water content of 3.0% (the alcohol yield rate was 93%). The obtained alcohol-containing powder was highly soluble in water and its aqueous solution had reduced sweetness and viscosity and a good taste, and the powder was excellent in the storage stability. Thus, it was found that the obtained powder was valuable as a powdery cocktail or as an additive to various cakes and the like. When the saccharide composition of the obtained alcohol-containing powder was determined, it was found that the powder comprised 2.6% of $G_1$, 2.8% of $G_2$, 7.4% of $G_3$, 8.6% of $G_4$, 8.5% of $G_5$, 8.4% of $G_6$, 7.5% of $G_7$, 8.8% of $G_8$ and 45.4% of $G_{9-n}$.

When the separated upper layer was distilled by using a distilling device, an aqueous alcohol solution having an alcohol concentration of 65% was obtained. This solution could be used repeatedly for the above-mentioned fractionation. When the composition of the distillation residue was determined, it was found that the distillation residue comprised 28.5% of $G_1$, 27.3% of $G_2$, 13.5% of $G_3$, 6.7% of $G_4$, 3.3% of $G_5$, 2.7% of $G_6$, 2.2% of $G_7$, 2.3% of $G_8$ and 13.5 % of $G_{9-n}$.

EXAMPLE 2

In 300 Kg of an aqueous alcohol solution having an alcohol concentration of 58% was mixed and dissolved 190 Kg of a hydrolyzed starch (having a DE value of 23 and a water content of 5%) having a saccharide composition of 7.1% of $G_1$, 7.3% of $G_2$, 7.8% of $G_3$, 8.0% of $G_4$, 6.8% of $G_5$, 7.2% of $G_6$, 6.8% of $G_7$, 8.1% of $G_8$ and 40.9% of $G_{9-n}$, and in the same manner as described in Example 1, the liquid mixture was separated into 190 Kg of an upper layer (A) and 300 Kg of a lower layer (B). The upper layer (A) had a solid content of 28.5%, an alcohol content of 47.9% and a water content of 23.5%, and the lower layer (B) had a solid content of 42.4%, an alcohol content of 27.3% and a water content of 30.3%. Further, 300 Kg of the obtained lower layer (B) was mixed with 167 Kg of 92.4% alcohol and 133 Kg of water, and in the same manner as described in Example 1, the liquid mixture was separated into 382 Kg of an upper layer (C) and 218 Kg of a lower layer (D). The upper layer (C) had a solid content of 19.8%, an alcohol content of 41.4% and a water content of 38.8%, and the lower layer (D) had a solid content of 23.6%, an alcohol content of 35.9% and a water content of 40.4%.

In the same manner as described in Example 1, the alcohol component was recovered from 382 Kg of the upper layer (C) and the residue was dried to obtain 75 Kg of a dry product (having a water content of 5.0%). The product had a saccharide composition of 2.7% of $G_1$, 2.8% of $G_2$, 6.3% of $G_3$, 8.9% of $G_4$, 9.5% of $G_5$, 9.8% of $G_6$, 11.2% of $G_7$, 12.0% of $G_8$ and 36.8% of $G_{9-n}$, and the alcohol soluble critical concentration was 52%, the viscosity was 23 cps and the DE value was 17.1.

Then, 50 Kg of the obtained dry product was mixed and dissolved in 65 Kg of an original "Scotch whiskey" having an alcohol content of 48%, and the obtained liquid mixture was heated at 55° C. by a plate heater and spray-dried at a chamber temperature of 70° C. to obtain about 78 Kg of a Scotch whisky powder having an alcohol content of 36% (the alcohol yield rate was 91%). The perfume components other than the alcohol component were recovered without substantial loss together with the alcohol component. When the powder was dissolved in water, the taste of the "Scotch whisky" was substantially restored. The powder could be used broadly as a material of a whisky drink or as a material to be added to various foods.

EXAMPLE 3

In subjecting an emulsion of corn starch to two-staged hydrolysis using α-amylase, a hydrolysis liquid obtained by conducting the first stage liquefaction using α-amylase (Crystase KD supplied by Daiwa Kasei K.K.) until the DE value was 1.7 was heated and boiled to inactivate the enzyme and effect swelling and dispersion of the starch, and the second stage hydrolysis was conducted while adding α-amylase (Crystase KD) again until the DE value was 16.5 to obtain a hydrolyzed starch (having a water content of 3.0%) having an alcohol soluble critical concentration of 42.5% and having a saccharide composition of 1.1% of $G_1$, 5.7% of $G_2$, 8.7% of $G_3$, 7.3% of $G_4$, 6.8% of $G_5$, 13.7% of $G_6$, 13.4% of $G_7$ 7.7% of $G_8$ and 35.6% of $G_{9-n}$. Then, 100 Kg of the obtained hydrolyzed starch was added to 125 Kg of a brandy (V.S.O.P) (having an alcohol content of 46%), and the resulting liquid mixture was heated at 55° C. by a plate heater and spray-dried at a chamber temperature of 72° C. to obtain about 152 Kg of a brandy powder having an alcohol content of 34.3%. (The alcohol yield rate was 91%).

When the obtained brandy powder was dissolved in water, the perfume of the resulting solution was not substantially different from that of the brandy before drying, and the solution had a low viscosity and a good taste. The powder was excellent in storage stability characteristics such as the moisture resistance and anti-caking property.

EXAMPLE 4

In about 180 l of water was dissolved 80 Kg of the same hydrolyzed starch (having a DE value of 24 and a water content of 5.0%) as used in Example 1, and 8 g of magnesium sulfate, 50 g of monopotassium phosphate, 80 g of yeast extract powder, 30 g of peptone and 160 g of baker's yeast (supplied by Kaneka Yeast K.K.), and the solution was stirred and maintained at 30±1° C. while introducing sterilized air at a rate of 60 ml/min per liter of the solution. In this state, culturing was conducted for 45 hours, and the pH value was adjusted to 6.5 by sodium carbonate and the culture broth was heated at 90° C. to effect sterilization. The resulting liquid was subjected to decoloring, deodorizing and desalting treatments using active carbon and an ion-exchange resin and was then spray-dried to obtain 68 Kg of a dry powder (having a water content of 2.5%). The obtained powder had an alcohol soluble critical concentration of 42%, a DE value of 14 and a viscosity of 45 cps and had a saccharide composition of 1% of $G_1$, 1.2% of $G_2$, 6.4% of $G_3$, 9.2% of $G_4$, 9.9% of $G_5$, 8.4% of $G_6$, 8.0% of $G_7$, 10.5% of $G_8$ and 45.4% and $G_{9-n}$.

Then, 38 Kg of the obtained powder was added to a liquid mixture of 33 Kg of a refined "sake" of a dry taste (having an alcohol content of 16%, an extract content of 4% and a water content of 80%) and 22 Kg of 92.4% alcohol and the mixture was heated at 60° C. and spray-dried at a chamber temperature of 75° C. to obtain about 63 Kg of a powdered refined "sake" having an alcohol content of 37.5% (the alcohol yield rate was 93%).

When the obtained powdered refined "sake" was dissolved in warm water, there was obtained a refined "sake" drink having a dry taste and being free of the sweetness due to the carrier, and the perfume of the starting refined "sake" was sufficiently retained and the drink had a good flavor and had no viscousness.

EXAMPLE 5

An emulsion of glutinous corn starch was subjected to two-staged hydrolysis using α-amylase in the following manner. The first stage liquefaction hydrolysis was conducted by using Crystase KD (α-amylase) until the DE value was 1.8, and the obtained liquid was heated and boiled to inactivate the enzyme and effect swelling and dispersion of the starch. At the second stage, Crystase KD was added again and hydrolysis was conducted until the DE value was 18, and the liquid was dried to obtain a hydrolyzed starch having a saccharide composition of 1.5% of $G_1$, 7.2% of $G_2$, 11.5% of $G_3$, 9.1% of $G_4$, 8.3% of $G_5$, 16.8% of $G_6$, 13.5% of $G_7$, 5.5% of $G_8$ and 26.6% of $G_{9-n}$. In the same manner as described in Example 4, 80 Kg of the hydrolyzed starch (having a water content of 5%) was treated with yeast to convert low saccharides such as glucose and maltose, and the treated starch was subjected to decoloring and desalting treatments and then dried to obtain about 70 Kg of a dry powder (having a water content of 3.0%). The obtained powder had an alcohol soluble critical concentration of 47% and a saccharide composition of 0% of $G_1$, 0% of $G_2$, 11.1% of $G_3$, 10.1% of $G_4$, 9.2% of $G_5$, 18.8% of $G_6$, 15% of $G_7$, 6.1% of $G_8$ and 29.7% of $G_{9-n}$.

Then, 70 Kg of the obtained powder was added to 100 Kg of a dark rum having an alcohol content of 50%, which was produced in Jamaica, and the mixture was heated at 65° C. by a plate heater and spray-dried at a chamber temperature of 70° C. to obtain 117 Kg of a powdered rum having an alcohol content of 40% (the alcohol yield rate was 94.2%).

The obtained powdered rum had a good water solubility, and the taste of an aqueous solution of the powder was not substantially different from that of the starting rum before powdering. Furthermore, the viscousness, sweetness and smell due to the carrier were not substantially observed. Moreover, the powdered rum was excellent in stability characteristics such as the moisture absorption resistance in the powdery state.

EXAMPLE 6

A solution comprising 27.5 Kg of red wine (having an alcohol content of 10% and an extract content of 4%), 20 Kg of 95% alcohol for brewage, 0.4 Kg of tartaric acid, 0.1 Kg of malic acid, 0.3 Kg of citric acid, 0.1 Kg of a wine perfume and 0.05 Kg of a strawberry perfume was mixed with 36 Kg of a dry powder of a hydrolyzed starch obtained by converting low saccharides with yeast in the same manner as described in Example 4. The resulting liquid mixture was heated at 60° C. by a plate heater and spray-dried at a chamber temperature of 75° C. to obtain about 57 Kg of a powder having an alcohol content of 33.5%. Then, 50 Kg of the so-obtained powder was homogeneously mixed with 10 Kg of granulated sugar to form a wine cocktail powder. When 40 g of the wine cocktail powder was dissolved in 120 ml of cold water, the water solubility was very good and the obtained "wine cocktail" was free of the viscousness and was excellent in the taste and flavor. When the obtained wine cocktail powder was sealed in aluminum-laminated bags and stored for a long time, it was found that stability characteristics such as the anti-caking property, moisture absorption resistance and taste-retaining property were excellent. Thus, it was confirmed that the obtained powder was valuable as an instant cocktail.

EXAMPLE 7

A solution comprising 45 Kg of a "mirin" (a sweet seasoning liquor) (having an extract content of 8% and an alcohol content of 20%) and 22 Kg of 95% alcohol was mixed with 50 Kg of the dry powder of the hydrolyzed starch obtained in Example 5, and the resulting liquid mixture was heated at 50° C. by a plate heater and spray-dried at a chamber temperature of 72° C. to obtain about 75 Kg of a powdered "mirin" having an alcohol content of 31%.

EXAMPLE 8

To 45 Kg of a lemon essence (having an alcohol content of 50%) was added 43.5 Kg of the dry powder of the hydrolyzed starch obtained in Example 2, then dissolved, and the resulting liquid mixture was spray-dried at a chamber temperature of 75° C. to obtain about 65 Kg of a powdered lemon essence. The obtained powder had an alcohol content of 31.2% and a water content of 2.5%, and the taste of an aqueous solution of the powder was substantially the same as that of the lemon essence (liquid) before drying. When the powder was stored for a long time, the taste was not changed at all. This powder could be used as an additive to an instant juice or tea.

EXAMPLE 9

To a solution comprising 64 Kg of a pepper tincture (having an alcohol content of 85%) and 54 Kg of water was added 100 Kg of the dry powder of the hydrolyzed starch obtained in Example 3, then dissolved, and the resulting liquid mixture was spray-dried at 78° C. to obtain about 150 Kg of a powdered pepper tincture (having an alcohol content of 32.3%). The obtained powder could be effectively used for various sauce mixes.

EXAMPLE 10

To 140 Kg of a liquid (having an alcohol content of 40% and an extract content of 5%) obtained by extracting dried bonito with aqueous alcohol was added 125 Kg of the dry powder of the hydrolyzed starch obtained in Example 3, then dissolved, and the resulting solution was spray-dried at a chamber temperature of 78° C. to obtain about 182 Kg of a powdered bonito extract having an alcohol content of 27%. The flavor of the dried bonito was sufficiently retained in the obtained powder as well as the alcohol component, and when the powder was stored for a long time, a good storage stability was observed. Accordingly, it was confirmed that the powder could be effectively used for various instant seasonings.

What is claimed is:

1. A process for preparing alcohol-containing powders with a high alcohol content in a high yield, which comprises mixing a hydrolyzed starch which comprises at least 50% of saccharides having a glucose polymerization degree of 1 to 8 and comprises up to 10% of saccharides having a glucose polymerization degree of 1 to 2, said hydrolyzed starch being soluble in 40 W/W % aqueous solution of an alcohol, with an alcohol-containing aqueous solution having an alcohol concentration of at least 40 W/W %, said starch being present in an amount of 100 to 200% based on the water contained in the alcohol-containing aqueous solution, and spray-drying the resulting liquid mixture.

2. A process for preparing alcohol-containing powders with a high alcohol content in a high yield according to claim 1, wherein the alcohol-containing aqueous solution having an alcohol concentration of at least 40 W/W % is one selected from the group consisting of alcoholic beverages and aqueous ethanol solutions containing only water and ethanol.

3. A process for preparing alcohol-containing powders with a high alcohol content in a high yield according to claim 1, wherein the alcohol-containing aqueous solution having an alcohol concentration of at least 40 W/W % contains a material selected from the group consisting of perfume selected from the group consisting of vanilla tincture and orange essence, spice tinture selected from the group consisting of pepper tincture and ginger ale tincture, raw drug tincture selected from the group consisting of licorice root tincture and green gentian tincture, aqueous alcohol extract of table luxury material selected from the group consisting of tea leaves, coffee beans and cocoa beans, and aqueous alcohol extract of seasoning material selected from the group consisting of dried bonito and tangle.

* * * * *